(12) United States Patent
Terao (10) Patent No.: US 10,666,625 B2
(45) Date of Patent: May 26, 2020

(54) COMMUNICATION APPARATUS, COMMUNICATION METHOD, AND NON-TRANSITORY COMPUTER-READABLE STORAGE MEDIUM FOR REDUCING THE TIME FOR AUTOMATIC SETTING OF COMMUNICATION PARAMETERS

(71) Applicant: CANON KABUSHIKI KAISHA, Tokyo (JP)

(72) Inventor: Tsuyoshi Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 15/745,956

(22) PCT Filed: Jul. 13, 2016

(86) PCT No.: PCT/JP2016/003309
§ 371 (c)(1),
(2) Date: Jan. 18, 2018

(87) PCT Pub. No.: WO2017/013852
PCT Pub. Date: Jan. 26, 2017

(65) Prior Publication Data
US 2018/0212936 A1     Jul. 26, 2018

(30) Foreign Application Priority Data
Jul. 21, 2015   (JP) ................. 2015-144400

(51) Int. Cl.
*H04L 29/06*     (2006.01)
*H04L 9/08*     (2006.01)
(Continued)

(52) U.S. Cl.
CPC ........ *H04L 63/0442* (2013.01); *H04L 9/0825* (2013.01); *H04L 63/0492* (2013.01);
(Continued)

(58) Field of Classification Search
CPC ............ H04L 63/0485; H04L 67/1046; H04L 63/0492; H04W 12/00503; H04W 12/00407
See application file for complete search history.

(56) References Cited

U.S. PATENT DOCUMENTS 6,185,685 B1 * 2/2001 Morgan ................ H04L 9/0841
713/168
8,787,572 B1 7/2014 Tewari et al.
(Continued)

FOREIGN PATENT DOCUMENTS

CN          102291427 A     12/2011
CN          102387501 A      3/2012
(Continued)

*Primary Examiner* — Thaddeus J Plecha
(74) *Attorney, Agent, or Firm* — Canon U.S.A., Inc. IP Division (57) ABSTRACT

A communication apparatus transmits a search signal including information based on a character string input by a user, the search signal being used to search for a providing apparatus that provides a communication parameter. Upon reception of a response to the search signal, the communication apparatus starts communication parameter sharing processing with a providing apparatus that has transmitted the response.

10 Claims, 7 Drawing Sheets

(51) Int. Cl.
*H04W 12/00* (2009.01)
*H04L 29/08* (2006.01)
*H04W 12/04* (2009.01)
*H04W 12/06* (2009.01)
*H04W 84/12* (2009.01)

(52) U.S. Cl.
CPC ....... *H04L 67/1046* (2013.01); *H04W 12/003* (2019.01); *H04W 12/04* (2013.01); *H04W 12/06* (2013.01); *H04L 2209/80* (2013.01); *H04W 84/12* (2013.01)

(56) References Cited

U.S. PATENT DOCUMENTS

| | | | |
|---|---|---|---|
| 9,071,967 B1* | 6/2015 | Davies | H04W 12/06 |
| 2004/0068653 A1 | 4/2004 | Fascenda | |
| 2005/0265286 A1 | 1/2005 | Umemura | |
| 2005/0128304 A1 | 6/2005 | Manasseh | |
| 2006/0200854 A1 | 9/2006 | Saito | |
| 2007/0201087 A1 | 8/2007 | Saito | |
| 2007/0239877 A1 | 10/2007 | Uchida | |
| 2010/0027414 A1 | 2/2010 | Hamachi | |
| 2011/0047603 A1 | 2/2011 | Gordon | |
| 2012/0054493 A1 | 3/2012 | Bradley | |
| 2012/0086549 A1 | 4/2012 | Barnes | |
| 2012/0290609 A1 | 11/2012 | Britt | |
| 2012/0322384 A1 | 12/2012 | Zerr et al. | |
| 2013/0034023 A1 | 2/2013 | Jung | |
| 2013/0081121 A1* | 3/2013 | Green | H04L 9/0827 726/7 |
| 2013/0156017 A1 | 6/2013 | Hori et al. | |
| 2013/0170482 A1* | 7/2013 | Jung | H04W 8/005 370/338 |
| 2013/0223361 A1* | 8/2013 | Park | H04W 12/06 370/329 |
| 2013/0318352 A1 | 11/2013 | Ichikawa et al. | |
| 2014/0092425 A1 | 4/2014 | Park | |
| 2014/0185602 A1 | 7/2014 | Goto | |
| 2014/0220939 A1 | 8/2014 | Takae | |
| 2014/0268222 A1 | 9/2014 | Noue et al. | |
| 2014/0310515 A1* | 10/2014 | Kim | H04L 9/321 713/155 |
| 2014/0355063 A1 | 12/2014 | Jang et al. | |
| 2015/0079939 A1 | 3/2015 | Naka | |
| 2015/0332038 A1* | 11/2015 | Ramsden | G06F 21/32 726/19 |
| 2015/0381594 A1* | 12/2015 | Venkatesan | G06F 16/955 726/6 |
| 2016/0315923 A1* | 10/2016 | Riscombe-Burton | H04W 12/04 |

FOREIGN PATENT DOCUMENTS

| | | |
|---|---|---|
| CN | 102833345 | 12/2012 |
| EP | 1887730 A1 | 2/2008 |
| JP | 2006311137 A | 11/2006 |
| JP | 2008-219457 A | 9/2008 |
| JP | 2011199408 A | 10/2011 |
| JP | 2012095191 A | 5/2012 |
| JP | 2013247459 A | 12/2013 |
| JP | 2014-60623 A | 4/2014 |
| JP | 2014-230152 A | 12/2014 |

* cited by examiner

COMMUNICATION APPARATUS, COMMUNICATION METHOD, AND NON-TRANSITORY COMPUTER-READABLE STORAGE MEDIUM FOR REDUCING THE TIME FOR AUTOMATIC SETTING OF COMMUNICATION PARAMETERS

TECHNICAL FIELD

The present invention relates to a communication technology.

BACKGROUND ART

In wireless communication, such as communication using a wireless local area network (LAN) conforming to the Institute of Electrical and Electronics Engineers, Inc. (IEEE) 802.11 standard series, a large number of setting items have to be set before use. Examples of the setting items include communication parameters necessary to perform wireless communication, such as a service set identifier (SSID) as a network identifier, an encryption method, an encryption key, an authentication method, and an authentication key. It is excessively troublesome for a user to manually set all of the items.

On the other hand, Wi-Fi Protected Setup (hereinafter referred to as WPS), which is an industry-standard automatic setting method for easily setting communication parameters in wireless apparatuses, has been standardized and increasingly installed on wireless apparatuses. As one of methods for WPS, there is a method using terminal identification information (e.g., information called personal information number (PIN) code) for identifying wireless apparatuses. In this method, terminal identification information generated by an apparatus (hereinafter referred to as a receiving apparatus) that receives communication parameters is registered in an apparatus (hereinafter referred to as a providing apparatus) that provides the communication parameters. Thus, setting information that enables communication according to the above standard is automatically transmitted, received, and set, thereby establishing a connection using a security function.

PTL 1 discloses a technique related to a method for registering terminal identification information at the time of setting of a wireless LAN.

In the case of performing automatic setting of communication parameters by this method using the terminal identification information, if there are a plurality of providing apparatuses, the receiving apparatus has to determine whether or not correct terminal identification information has been registered after having been connected to each of the providing apparatuses. Specifically, upon finding a providing apparatus by a search, the receiving apparatus becomes connected to the found providing apparatus by a wireless LAN conforming to the IEEE 802.11 standard series. Association Request/Response defined in the IEEE 802.11 standard series is used for connection. After having been connected to the providing apparatus, the receiving apparatus transmits an extensible authentication protocol-start (EAPOL-start) message and starts a registration protocol defined in WPS. Then, in the registration protocol, the providing apparatus determines whether or not terminal identification information generated by the receiving apparatus is also registered in the providing apparatus and determines whether or not to continue the registration protocol depending on the result.

Thus, in the method of the related art, a providing apparatus to which terminal identification information different from the terminal identification information generated by the receiving apparatus has been input is unnecessarily connected by using Association Request/Response of the wireless LAN.

CITATION LIST

Patent Literature

PTL 1: Japanese Patent Laid-Open No. 2008-219457

SUMMARY OF INVENTION

In view of the above circumstances, the present invention prevents an unnecessary connection to a providing apparatus to which terminal identification information different from that of the receiving apparatus has been input and shortens the time taken for automatic setting of communication parameters.

A communication apparatus according to an embodiment of the present invention includes an acquiring unit that acquires a predetermined character string input by a user; a transmitting unit that transmits a search signal including information based on the character string acquired by the acquiring unit, the search signal being used to search for a providing apparatus that provides a communication parameter; a receiving unit that receives a response to the search signal; and a starting unit that starts, on the basis of the response received by the receiving unit, communication parameter sharing processing with a providing apparatus that has transmitted the response.

Further features of the present invention will become apparent from the following description of exemplary embodiments with reference to the attached drawings.

DESCRIPTION OF EMBODIMENTS

First Embodiment

Communication apparatuses according to this embodiment will be described below in detail with reference to the drawings. The following description illustrates an example of using a wireless LAN system conforming to the IEEE 802.11 series. However, the communication scheme is not necessarily limited to the wireless LAN conforming to the IEEE 802.11 series.

Figure 3:
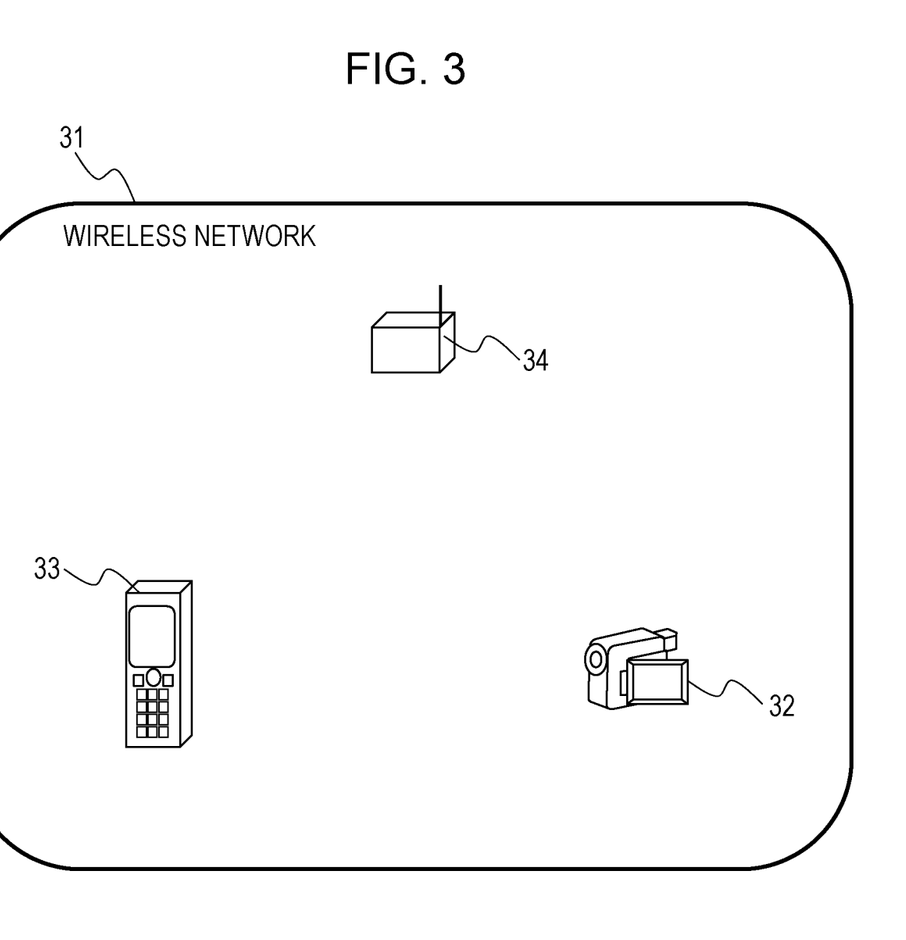
FIG. 3 illustrates an exemplary configuration of a communication system.

FIG. 3 illustrates a communication system according to this embodiment. The communication system illustrated in FIG. 3 includes a camera 32, a mobile phone 33, an access point (hereinafter referred to as AP) 34, and a wireless network 31. The following description will illustrate the case where the camera 32 and the mobile phone 33 join the wireless network 31 established by the AP 34 and where the camera 32 and the mobile phone 33 communicate with each other in the wireless network 31 through the AP 34.

Although the camera 32 and the mobile phone 33 are described as communication apparatuses in the communication system according to this embodiment, other communication apparatuses may also be used, such as a printer, a personal computer (PC), a video camera, a smart watch, a personal digital assistant (PDA), and any of various digital home appliances.

Figure 1:
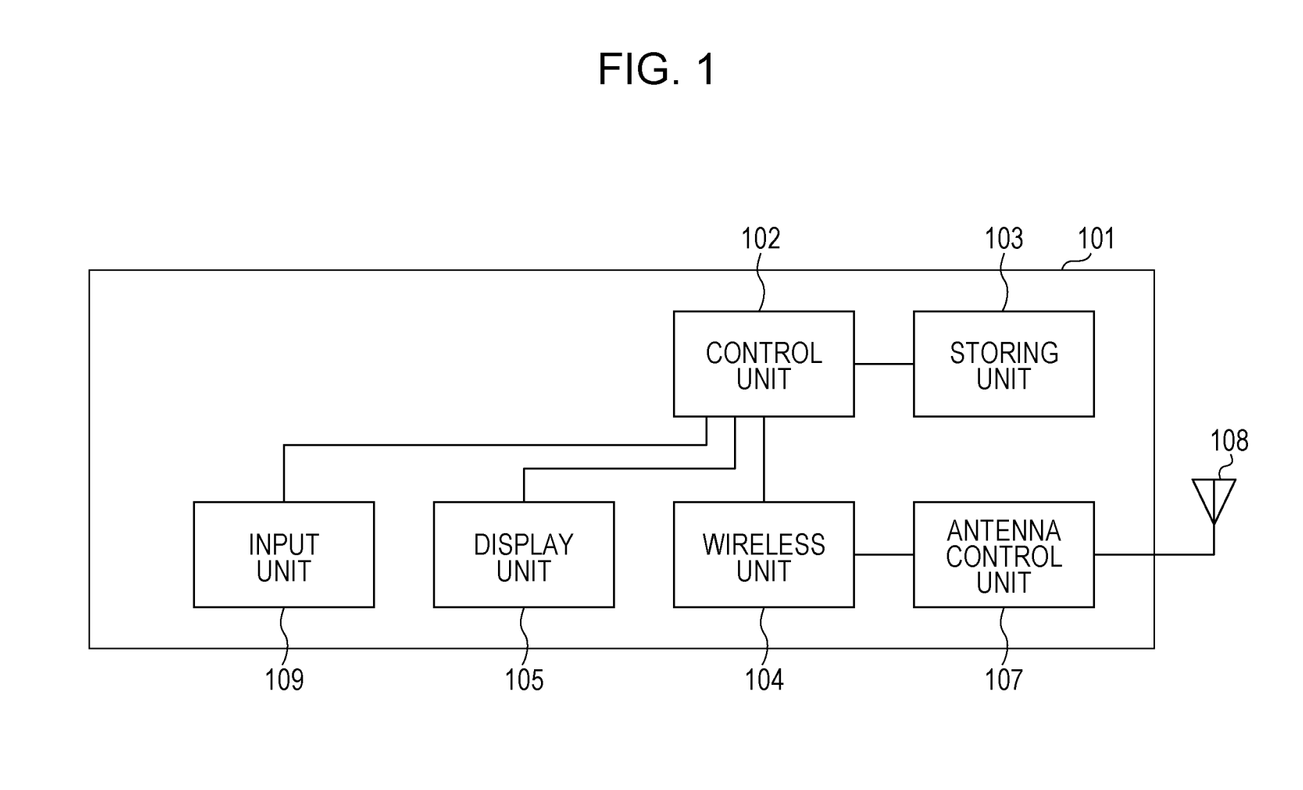
FIG. 1 illustrates a configuration of a communication apparatus.

Next, a hardware configuration of each of the camera 32 and the mobile phone 33 in this embodiment will be described with reference to FIG. 1. FIG. 1 illustrates an overall communication apparatus 101. A control unit 102 controls the overall communication apparatus 101 by executing a control program stored in a storing unit 103. The control unit 102 is formed of a central processing unit (CPU), for example. The storing unit 103 stores various kinds of information, such as the control program executed by the control unit 102, image data, and communication parameters. Various operations described later are performed by the control unit 102 executing the control program stored in the storing unit 103. The storing unit 103 is formed of a storage medium, such as a read-only memory (ROM), a random access memory (RAM), a hard disk drive (HDD), a flash memory, or a detachable secure digital (SD) card.

A wireless unit 104 is used to perform wireless LAN communication conforming to the IEEE 802.11 series. The wireless unit 104 is formed of a chip that performs wireless communication. A display unit 105 performs various kinds of display and has a function capable of outputting visually recognizable information, such as a function of a liquid crystal display (LCD) or a light emitting diode (LED), or a function capable of outputting sound, such as a function of a speaker. The display unit 105 has a function of outputting a character string in the form of at least one of visual information and sound information. In the case where visual information is to be displayed, the display unit 105 includes a video RAM (VRAM) that stores image data corresponding to the visual information to be displayed. The display unit 105 performs display control in such a manner that the LCD or LED keeps displaying the image data stored in the VRAM.

An antenna control unit 107 controls output from an antenna 108. The antenna 108 can perform communication in a 2.4 GHz band and/or a 5 GHz band in order to perform communication on a wireless LAN. A user inputs various kinds of information and the like by using an input unit 109 in order to operate the communication apparatus 101. The input unit 109 causes a memory, such as the storing unit 103, to store an input character string.

Figure 2:
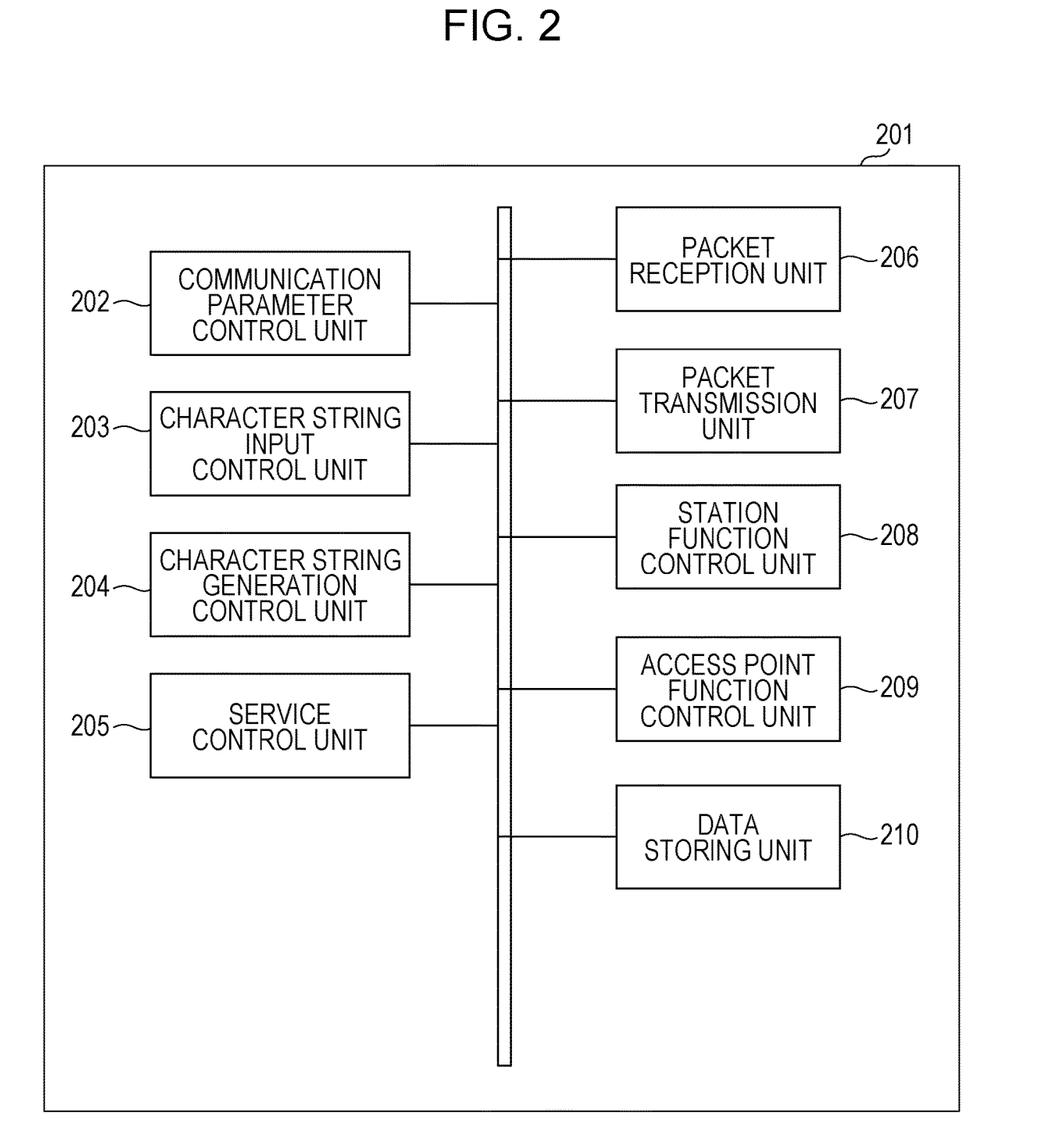
FIG. 2 illustrates a software functional configuration of the communication apparatus.

FIG. 2 is a block diagram illustrating an exemplary configuration of software functional blocks that execute a communication control function described later. In this embodiment, each of the functional blocks of the camera 32 and the mobile phone 33 is stored in a corresponding storing unit 103 as a program, and the functions of the camera 32 and the mobile phone 33 are performed by a corresponding control unit 102 executing the program. The control unit 102 realizes each function by controlling each piece of hardware and calculating and processing information in accordance with the control program. Note that some or all of the functional blocks may be realized as hardware. In this case, some or all of the functional blocks are formed as an application specific integrated circuit (ASIC), for example.

FIG. 2 illustrates an overall software functional block 201. A communication parameter control unit 202 performs communication parameter sharing processing for sharing communication parameters between the communication apparatuses. In the communication parameter sharing processing, a providing apparatus provides communication parameters for performing wireless communication to a receiving apparatus. Here, the communication parameters include wireless communication parameters necessary to perform wireless LAN communication, such as an SSID as a network identifier, an encryption method, an encryption key, an authentication method, and an authentication key. The communication parameters may further include a media access control (MAC) address, a pass phrase, an internet protocol (IP) address for performing communication in the IP layer, and information necessary for high-layer services. The communication parameter sharing processing performed by the communication parameter control unit 202 may be Wi-Fi Protected Setup (WPS) or Wi-Fi Direct defined by Wi-Fi Alliance.

A character string input control unit 203 acquires a character string input by using the input unit 109. The character string acquired by the character string input control unit 203 may be a character string consisting of numbers only, letters and numbers only, symbols only, or a combination thereof.

A character string generation control unit 204 generates the character string used to provide the communication parameters and performs control in order to display the generated character string on the display unit 105. A service control unit 205 is a service control unit in the application layer. The application layer here means a service providing layer in a high layer that is Layer 5 or higher in an open systems interconnection (OSI) reference model. That is, the service control unit 205 performs printing processing, image streaming processing, file transfer processing, and the like by using wireless communication performed by the wireless unit 104.

A packet reception unit 206 and a packet transmission unit 207 control transmission and reception of various packets including a high-layer communication protocol. The packet reception unit 206 and the packet transmission unit 207 control the wireless unit 104 in order to transmit and receive packets conforming to the IEEE 802.11 standard to and from another communication apparatus.

A station (STA) function control unit 208 provides an STA function for operating as an STA in an infrastructure mode defined in the IEEE 802.11 standard. The STA function control unit 208 performs authentication and encryption processing, for example, when operating as an STA. An access point (AP) function control unit 209 provides an AP function for operating as an AP in an infrastructure mode defined in the IEEE 802.11 standard. The AP function control unit 209 establishes a wireless network, performs authentication and encryption processing with respect to the STA, and manages the STA, for example. A data storing unit 210 controls software and controls writing and reading of information regarding communication parameters and barcodes to and from the storing unit 103.

The above functional blocks are examples, and a plurality of functional blocks may realize a single functional block, or any one of the functional blocks may be further divided into blocks performing a plurality of functions.

Figure 4:
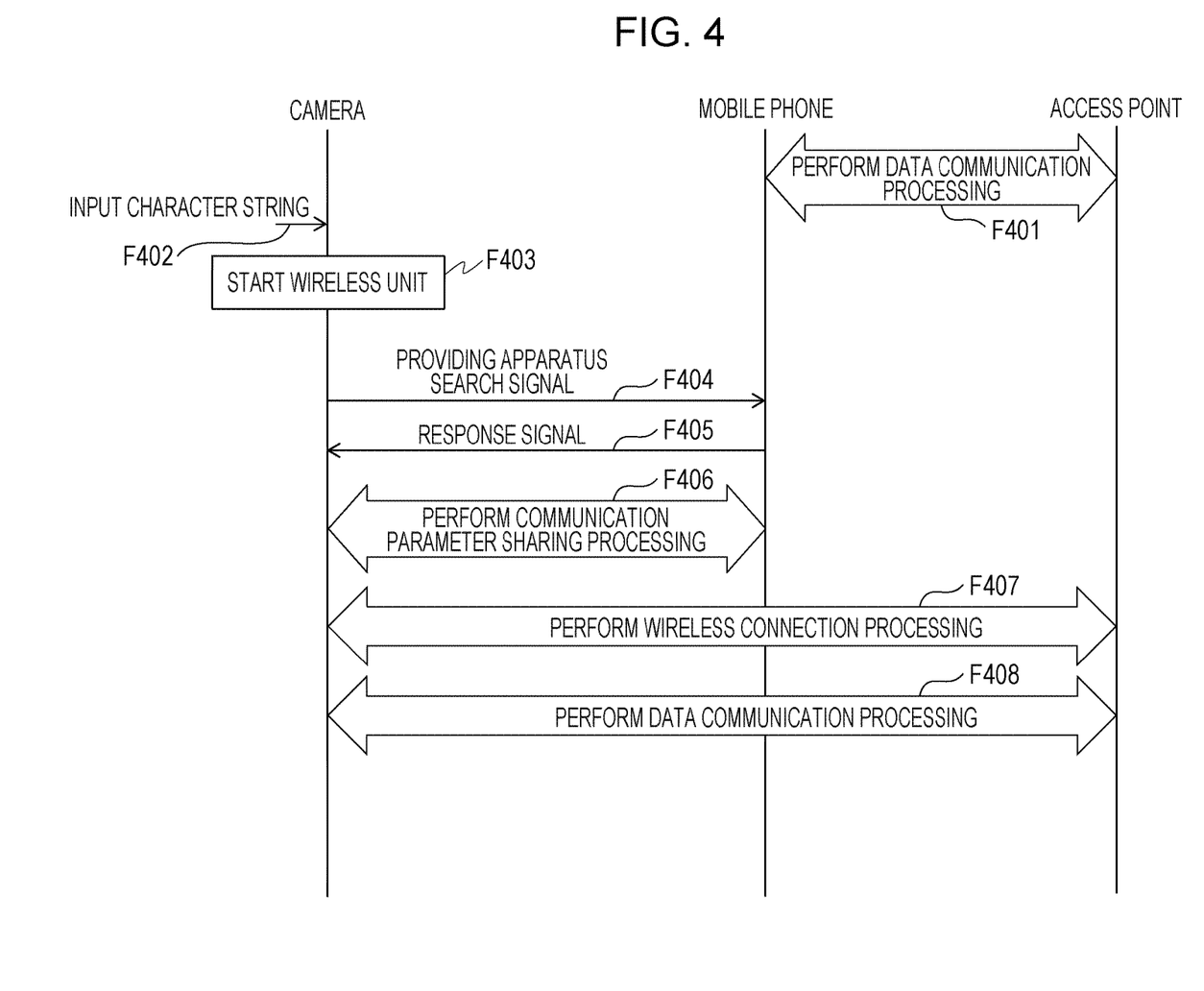
FIG. 4 illustrates an exemplary sequence in the communication system.

The communication system having the above configuration operates as follows. FIG. 4 illustrates a connection sequence during communication setting between the following communication apparatuses: the camera 32, the mobile phone 33, and the AP 34. This example illustrates the case where the camera 32 is allowed to join the wireless network 31 established by the AP 34. In FIG. 4, the mobile phone 33 is connected to the wireless network 31 established by the AP 34, and already stores communication parameters for performing communication. In addition, the mobile phone 33 performs data communication processing through the AP 34 (F401).

In order to allow the camera 32 to join the wireless network 31, the mobile phone 33 causes the character string generation control unit 204 of the mobile phone 33 to generate a character string for identifying the mobile phone 33 and causes the character string to be displayed on the display unit 105 of the mobile phone 33 in accordance with a user operation.

A user inputs the character string displayed on the mobile phone 33 by using the input unit 109 of the camera 32 (F402). On the basis of the character string obtained from the input unit 109, the camera 32 generates a search identifier to be used to search for a providing apparatus and an encryption key to be used to transmit a public key to the providing apparatus. For example, the search identifier may be a part or all of a hashcode generated by applying Secure Hash Algorithm-2 (SHA-2) to the input character string. In addition, the encryption key may be a part or all of a hashcode generated by applying SHA-2 to a temporal input character string generated by adding, to the input character string, at least one of a preset fixed character string or the MAC address of the camera 32. Note that the hash function used to generate the search identifier and the encryption key may be another hash function, such as Message Digest Algorithm 5 (MD5) or SHA-1.

In order to perform communication parameter sharing processing, the camera 32 starts the wireless unit 104 of the camera 32 (F403).

On the basis of the character string information read from the mobile phone 33, the camera 32 transmits a providing apparatus search signal to search for the providing apparatus (the mobile phone 33) (F404). This providing apparatus search signal may be an action frame defined in IEEE 802.11. The providing apparatus search signal is transmitted after adding thereto the search identifier generated in F402. In addition, the providing apparatus search signal is broadcast to all wireless terminals.

Upon reception of the providing apparatus search signal from the camera 32, the mobile phone 33 compares the search identifier included in the search signal with a search identifier generated by the mobile phone 33 by the same method as the generation method in F402. As a result of the comparison, if the search identifiers are determined to be identical to each other, the mobile phone 33 transmits a response signal to the camera 32 (F405). From the signal exchange in F404 and F405, the camera 32 recognizes the mobile phone 33 as the other communication apparatus with which the communication parameter sharing processing is to be performed, and the communication parameter sharing processing is performed between the camera 32 and the mobile phone 33 (F406). During the communication parameter sharing processing in F406, each of the mobile phone 33 and the camera 32 encrypts, by using a corresponding one of the encryption keys generated from the above character string, the public key that has been generated by the corresponding one of the terminals and that is used in a public key encryption method, and the mobile phone 33 and the camera 32 share the public keys with each other. Then, by using the public keys and private keys of the respective terminals, the mobile phone 33 and the camera 32 perform Diffie-Hellman key exchange, and each of the terminals generates an identical shared key. Then, the mobile phone 33 encrypts communication parameters by using the shared key and transmits the shared key to the camera 32. The communication parameters include one or more of the network identifier (SSID) of the wireless network 31, an authentication method, an encryption method, and a pass phrase. The communication parameters may further include information indicating the frequency band and channel of the wireless network 31. Through the above steps, the communication parameters necessary for the camera 32 to be connected to the wireless network 31 are provided safely from the mobile phone 33 to the camera 32.

After the communication parameters provided from the mobile phone 33 have been shared in wireless communication performed by the wireless unit 104 of the camera 32, by using the acquired communication parameters, the camera 32 is connected to the wireless network 31 established by the AP 34. Specifically, the camera 32 transmits an Association Request message defined in IEEE 802.11 to the AP 34 and then becomes connected to the wireless network 31 established by the AP 34 (F407). Then, the camera 32 performs data communication processing through the AP 34 (F408). In data communication in F408, the camera 32 may perform communication on the Internet to which the AP 34 is connected or may perform an image transfer service to transmit a captured image to the mobile phone 33 through the AP 34.

Next, operations of the camera 32 will be described with reference to the flowchart illustrated in FIG. 5. Note that the control unit 102 of the camera 32 implements the flowchart illustrated in FIG. 5 by executing the control program stored in the storing unit 103 and calculating and processing information and controlling each piece of hardware. One or more of the steps illustrated in the flowchart in FIG. 5 may be performed by hardware, such as an ASIC.

Figure 5:
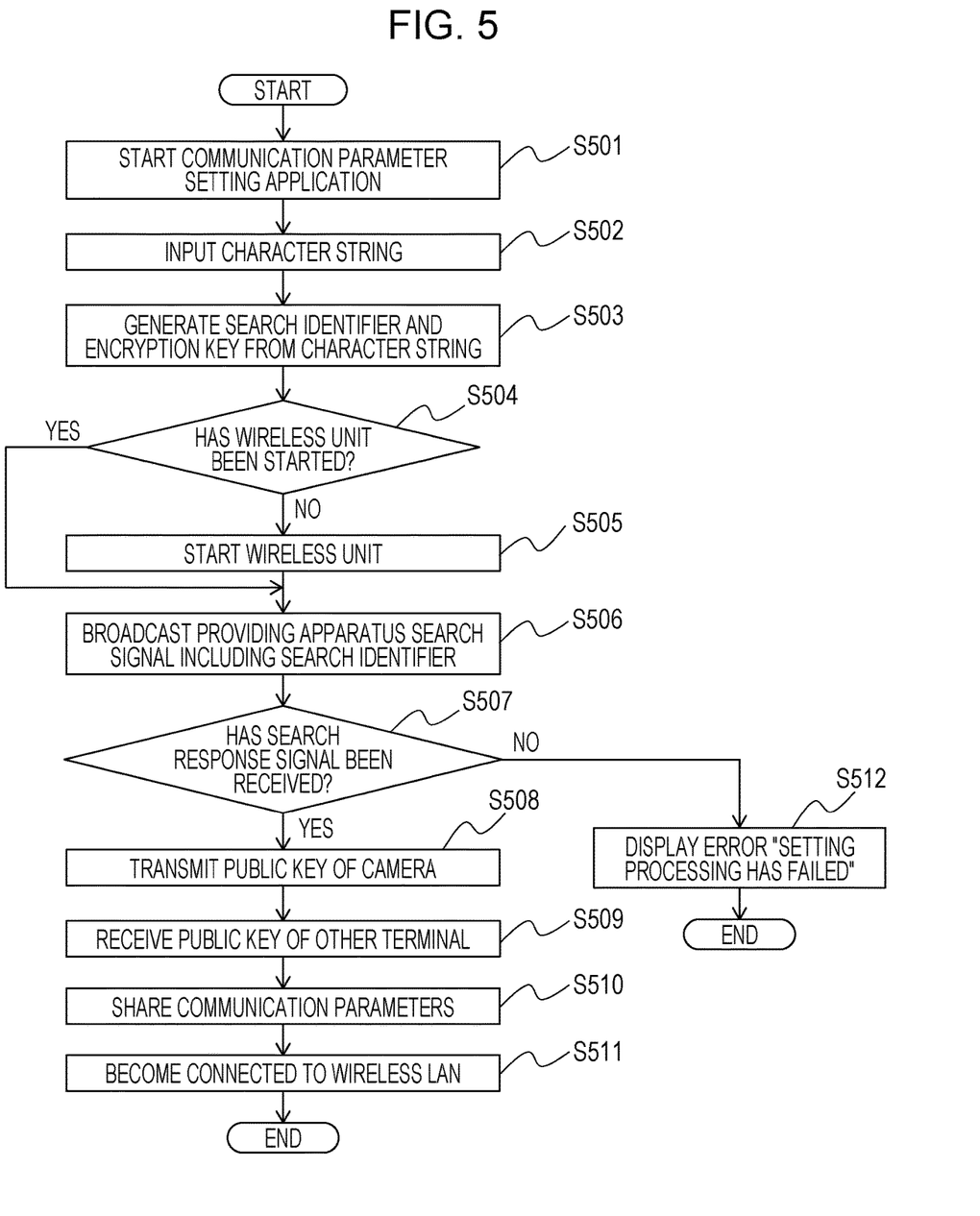
FIG. 5 is a flowchart illustrating operations of a communication apparatus that receives communication parameters.

The flowchart in FIG. 5 is started upon instruction of a communication parameter setting mode from a user through the input unit 109 of the camera 32. Upon being set to the communication parameter setting mode, the camera 32 starts a communication parameter setting application (S501). Here, the communication parameter setting application is an application that corresponds to the communication parameter control unit 202 and that is used to perform communication parameter sharing processing.

Upon starting the communication parameter setting application, the camera 32 starts the input unit 109 and displays, on the display unit 105, information that instructs the user to input a character string. The camera 32 acquires a character string from the user through the input unit 109 (S502).

Then, the camera 32 generates a search identifier and an encryption key from the character string acquired in S502 (S503). Note that the camera 32 may perform the steps in and after S503 without user operation once the character string is acquired in S502. The camera 32 may also ask the user if the subsequent steps are to be performed or not, and may perform the steps in and after S503 if an execution instruction is received from the user.

Then, the camera 32 determines whether or not the wireless unit 104 of the camera 32 has been started (S504). If the wireless unit 104 has not been started yet according to a result of the determination in S504, the camera 32 starts the wireless unit 104 (S505). If the wireless unit 104 has already been started, the process proceeds to S506.

Then, by using the wireless unit 104, the camera 32 broadcasts a providing apparatus search signal to search for a providing apparatus (the mobile phone 33 in FIG. 4) (S506). The providing apparatus search signal includes the search identifier generated in S503. The providing apparatus search signal is broadcast to all wireless terminals. Note that the providing apparatus search signal may be repeatedly transmitted on a preset specific channel only or on a set of a plurality of specific channels only. Alternatively, the wireless unit 104 may switch the channel among all usable frequency channels in a time division manner and may repeatedly transmit the providing apparatus search signal.

The camera 32 receives a search response signal with respect to the providing apparatus search signal transmitted in S506 (S507). If the search response signal is not received within a predetermined period after transmission of the providing apparatus search signal, or if the reception of the communication parameters has failed and the communication parameter sharing processing has failed in S507, the process ends as an error (S512). At this time, for example, the details of the error, such as the description "the setting processing has failed" may be displayed on the display unit 105. Furthermore, if a plurality of search response signals are received from different apparatuses in S507, the ending processing with the error displayed in S512 may be performed, or the process may proceed to S508 in which public keys are exchanged with the different apparatuses sequentially or simultaneously.

Upon reception of the search response signal in S507, the camera 32 starts the communication parameter sharing processing with a providing apparatus that has transmitted the search response signal. Here, the camera 32 generates a public key PUB_A of the camera 32 and a private key PRI_A that makes a pair with the public key PUB_A, and transmits the public key PUB_A to the providing apparatus (S508). In order to explicitly illustrate that the public key PUB_A is a public key of a terminal that owns the character string shared at the time of starting the setting, the public key PUB_A that is encrypted by using the encryption key generated in S503 is transmitted. Note that the public key PUB_A may be transmitted in an IEEE 802.11 action frame addressed to the providing apparatus by unicast transmission. The algorithm for encrypting the public key PUB_A may be a known algorithm for encrypting a shared key, such as advanced encryption standard key wrap (AES-Keywrap). The public key PUB_A and private key PRI_A generated in S508 may be a public key and private key used in a known asymmetric key encryption method, such as the Rivest-Shamir-Adleman (RSA) encryption method.

Then, the camera 32 receives, from the providing apparatus, a public key PUB_B that makes a pair with a private key PRI_B generated by the providing apparatus (S509). The public key PUB_B is encrypted by using the encryption key generated in S503, as in S508, and accordingly, the public key PUB_B is decrypted by using the encryption key generated in S503. If a frame including the public key PUB_B is not received in S509, or if it is not possible to correctly decrypt the public key PUB_B by using the encryption key generated in S503, the process may end by notifying the user of an error as in S512. If it is not possible to decrypt the encryption key, the process may return to S508 and may be continued with another apparatus that is different from the apparatus for which the error has occurred. In this case, the camera 32 is controlled in such a manner that the process is not repeated with the apparatus for which the error has already occurred.

Then, the camera 32 shares the communication parameters by using the public keys PUB_A and PUB_B shared with the providing apparatus (S510). For example, in S510, first, Diffie-Hellman key exchange is performed, and an identical shared key is generated in each of the terminals by using the public key PUB_A, the public key PUB_B, the private key PRI_A, and the private key PRI_B. Then, the camera 32 receives, from the providing apparatus, the communication parameters encrypted by the providing apparatus by using the shared key. Then, the camera 32 decrypts the received communication parameters by using the shared key.

Then, the camera 32 becomes connected to the wireless network 31 by using the communication parameters received from the providing apparatus and starts data communication through the AP 34 (S511).

Next, operations of the mobile phone 33 will be described with reference to the flowchart illustrated in FIG. 6. Note that the control unit 102 of the mobile phone 33 implements the flowchart illustrated in FIG. 6 by executing the control program stored in the storing unit 103 of the mobile phone 33 and calculating and processing information and controlling each piece of hardware. Note that one or more of the steps illustrated in the flowchart in FIG. 6 may be performed by hardware, such as an ASIC.

Figure 6:
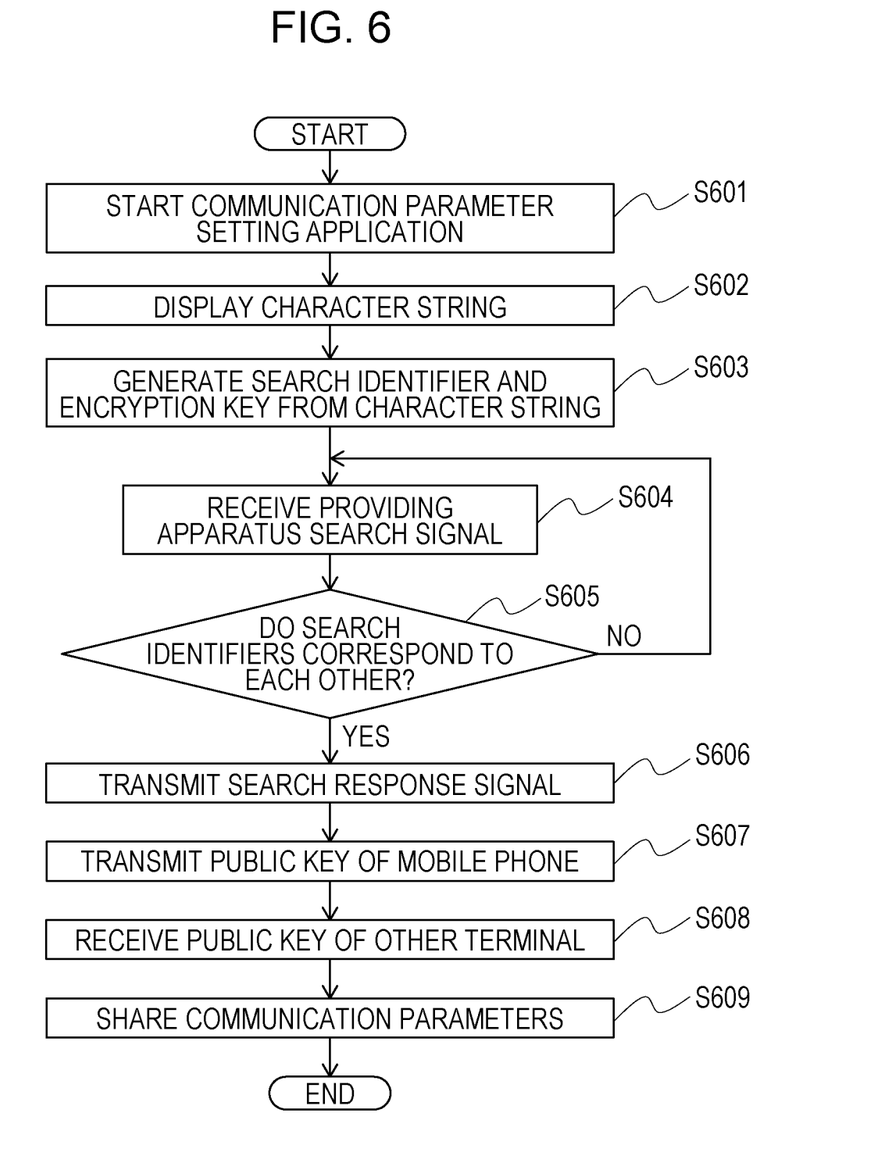
FIG. 6 is a flowchart illustrating operations of a communication apparatus that provides communication parameters.

The flowchart in FIG. 6 is started upon a user's instruction for a communication parameter setting mode through the input unit 109 of the mobile phone 33. Upon being set to the communication parameter setting mode, the mobile phone 33 starts a communication parameter setting application (S601). The communication parameter setting application here is an application that corresponds to the communication parameter control unit 202 and that is used to perform communication parameter sharing processing.

Upon starting the communication parameter setting application, the mobile phone 33 displays, on the display unit 105 thereof, the character string to be used for communication parameter setting (S602). The character string generation control unit 204 may randomly generate the character string displayed in S602 every time the display unit 105 displays the character string. Alternatively, the character string displayed in S602 may be the character string identical with that written on a label adhered to the mobile phone 33 at the time of ex-factory.

Then, the mobile phone 33 generates a search identifier and an encryption key from the character string displayed in S602 (S603). Note that the mobile phone 33 may perform the steps in and after S603 without user operation once the character string is displayed in S602.

Then, the mobile phone 33 receives a providing apparatus search signal from the receiving apparatus (the camera 32 in FIG. 4) by using the wireless unit 104 (S604). In S604, the mobile phone 33 may wait for a providing apparatus search signal on a wireless channel being used by the wireless network 31. Alternatively, in S604, the mobile phone 33 may temporarily be disconnected from the wireless network 31 and may wait for a providing apparatus search signal over a preset specific wireless channel.

Then, the mobile phone 33 determines whether or not the search identifier generated in S603 is included in the providing apparatus search signal received in S604 (S605). If it is determined in S605 that the search identifier is not included or a search identifier different from that generated in S603 is included, the process returns to S604 and the mobile phone 33 waits for a providing apparatus search signal again. On the other hand, if the providing apparatus search signal including the search identifier generated in S603 is received in S605, the mobile phone 33 transmits a search response signal to the apparatus that has transmitted the providing apparatus search signal (S606). The search response signal transmitted in S606 may be a unicast IEEE 802.11 action frame addressed to the apparatus that has transmitted the providing apparatus search signal. The search response signal transmitted in S606 may be an IEEE 802.11 action frame broadcast to all terminals. Alternatively, the search response signal may be a multicast IEEE 802.11 action frame transmitted to terminals belonging to the same multicast group. In addition, the search response signal may include information items, such as the MAC address, device name, manufacturer, and device nickname of the mobile phone 33, and the search identifier generated in S606. At the time the mobile phone 33 transmits the search response signal in S606, the mobile phone 33 may ask the user if the subsequent steps are to be performed or not and may perform the steps in and after S607 if an execution instruction is received from the user.

Then, in order to start communication parameter sharing processing with the receiving apparatus that has transmitted the providing apparatus search signal in S604, the mobile phone 33 generates a public key PUB_B of the mobile phone 33 and a private key PRI_B that makes a pair with the public key PUB_B and transmits the public key PUB_B to the receiving apparatus (S607). Note that the public key PUB_B that is encrypted by using the encryption key generated in S603 may be transmitted in S607. Alternatively, the public key PUB_B that is not encrypted may be transmitted.

Then, the mobile phone 33 receives, from the receiving apparatus, a public key PUB_A that makes a pair with a private key PRI_A generated by the receiving apparatus (S608). The public key PUB_A is also encrypted by using the encryption key generated in S603, as in S607, and accordingly, the mobile phone 33 decrypts the public key PUB_A by using the encryption key generated in S603. If a frame including the public key PUB_A is not received in S608, or if it is not possible to correctly decrypt the public key PUB_A by using the encryption key generated in S603, the process may end by notifying the user of an error.

Then, the mobile phone 33 shares the communication parameters by using the public keys PUB_A and PUB_B shared with the receiving apparatus (S609). For example, in S609 first, Diffie-Hellman key exchange is performed as in S510, and an identical shared key is generated in each of the terminals by using the public key PUB_A, the public key PUB_B, the private key PRI_A, and the private key PRI_B. Then, the mobile phone 33 encrypts the communication parameters by using the shared key and transmits the encrypted communication parameters to the receiving apparatus. The algorithm for encrypting the communication parameters by using the mobile phone 33 in S609 may be a known algorithm for encrypting a shared key, such as AES-Keywrap. Note that the encryption key used at the time the mobile phone 33 encrypts the communication parameters in S609 is not limited to the shared key itself shared by Diffie-Hellman key exchange and may be obtained by applying a known hash function, such as SHA-2, to the shared key.

In the above manner, according to this embodiment, it is possible to set the communication parameters on the basis of a result of determination as to whether or not the providing apparatus is performing a parameter providing operation on the basis of the character string identical to that of the receiving apparatus. Accordingly, it is possible to immediately find the providing apparatus that provides communication parameters on the basis of the identical character string, whereby a user's waiting time until the completion of communication parameter setting can be shortened. In addition, according to this embodiment, even if the user has input an incorrect character string as a character string to be used for communication parameter setting, the communication parameter setting is not started on the basis of such erroneous information, whereby unnecessary starting of communication parameter sharing processing can be prevented.

Second Embodiment

The first embodiment has illustrated the case where the camera 32 starts to transmit a signal to search for a providing apparatus upon obtaining a character string and waits for a search response from the mobile phone 33. This embodiment will illustrate a case of transmitting a report signal based on the character string generated by the mobile phone 33. Note that the apparatuses have the same configurations as those in the first embodiment.

Figure 7:
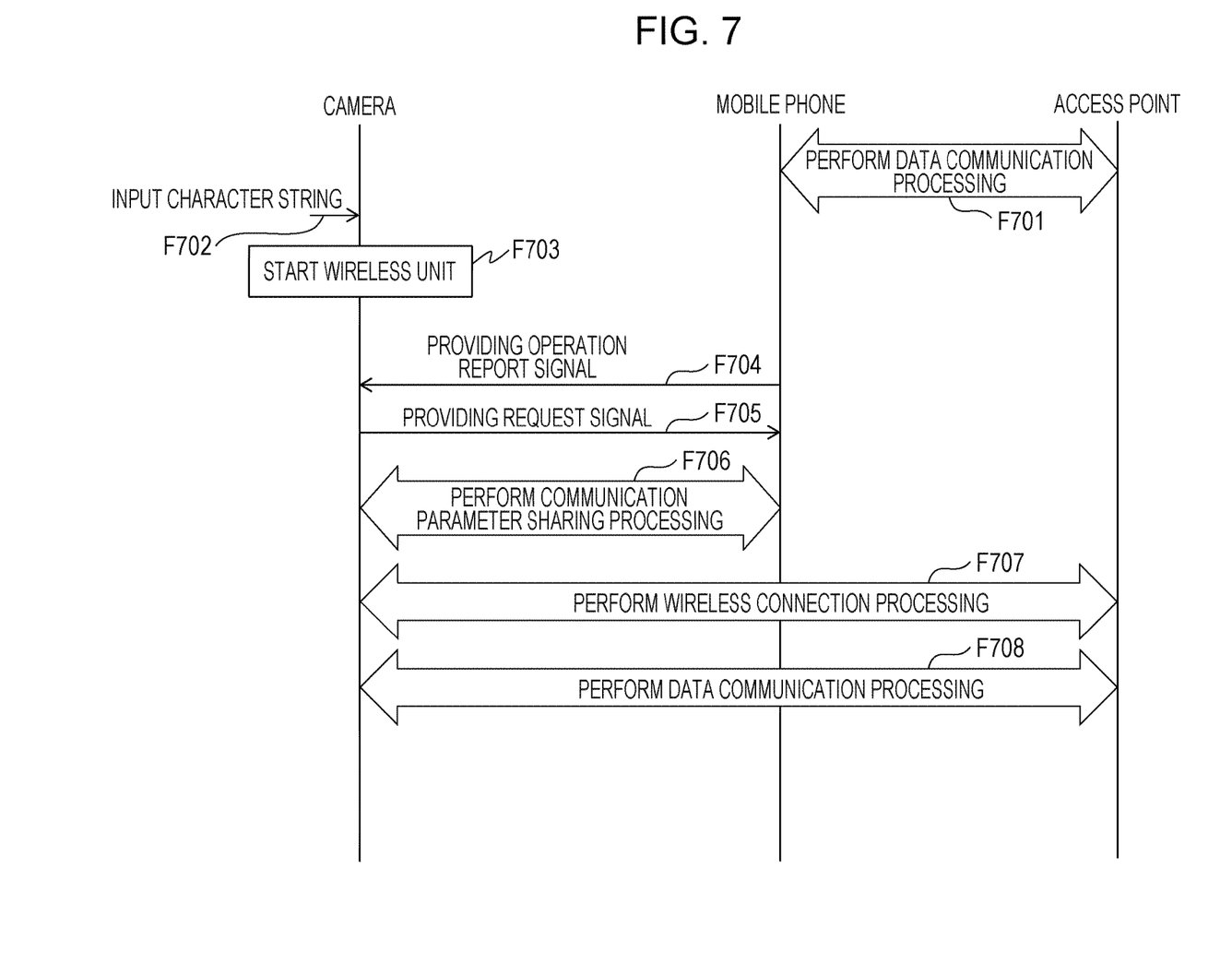
FIG. 7 illustrates an exemplary sequence in a communication system.

FIG. 7 illustrates a connection sequence during communication setting between the following communication apparatuses in this embodiment: the camera 32, the mobile phone 33, and the AP 34. This example illustrates the case where the camera 32 is allowed to join the wireless network 31 established by the AP 34. Note that F701 to F703 and F706 to F708 are the same as F401 to F403 and F406 to F408 in the first embodiment, respectively, and therefore a description thereof will be omitted.

Upon starting a parameter providing operation, on the basis of the character string information displayed in F702, the mobile phone 33 transmits, to the receiving apparatus (the camera 32), a providing operation report signal to report the parameter providing operation (F704). This providing operation report signal may be an action frame defined in IEEE 802.11. The providing operation report signal is transmitted after adding thereto the search identifier generated in F702. In addition, this report signal is broadcast to all wireless terminals. This report signal may further include a challenge code to verify that the receiving apparatus owns the identical character string. The challenge code included in the report signal may be a byte string randomly generated by the mobile phone 33.

Upon reception of the providing operation report signal from the mobile phone 33, the camera 32 compares the search identifier included in the providing operation report signal with the search identifier generated by the camera 32 by using the same method as the generation method in F702. As a result of the comparison, if the search identifiers are determined to be identical to each other, the camera 32 transmits a providing request signal to the mobile phone 33 (F705). Note that the providing request signal transmitted in F705 may be an IEEE 802.11 action frame addressed to the apparatus that has transmitted the providing operation report signal. Alternatively, the providing request signal may be an IEEE 802.11 action frame broadcast to all terminals. In addition, the providing request signal transmitted in F705 may include the challenge code that is included in the providing operation report signal and that is encrypted by the encryption key generated in F702.

From the signal exchange in F704 and F705, the camera 32 recognizes the mobile phone 33 as the other communication apparatus with which the communication parameter sharing processing is to be performed, and the communication parameter sharing processing is performed between the camera 32 and the mobile phone 33 (F706). Note that, in F706, the mobile phone 33 may decrypt, by using the encryption key generated in F702, the encrypted challenge code included in the providing request signal received from the camera 32, and may determine whether or not the decrypted challenge code corresponds to the challenge code added in F704. Only if the challenge codes correspond as a result of the determination, the communication parameter sharing processing in F706 may be performed. If the challenge codes do not correspond as a result of the determination, the parameter setting processing may be cancelled by notifying the user of an error by using the display unit 105.

In the above manner, according to this embodiment, it is possible to set the communication parameters on the basis of a result of determination as to whether or not the providing apparatus is performing a parameter providing operation on the basis of the character string identical to that of the receiving apparatus. Accordingly, it is possible to immediately find the providing apparatus performing a parameter providing operation on the basis of the identical character string, whereby a user's waiting time until the completion of communication parameter setting can be shortened. In addition, according to this embodiment, even if the user has input an incorrect character string as a character string to be used for communication parameter setting, the communication parameter setting is not started on the basis of such erroneous information, whereby unnecessary starting of communication parameter sharing processing can be prevented.

Other Embodiments

The above embodiments have illustrated the configurations in which information for performing communication parameter setting by using a character string is exchanged between communication apparatuses. However, instead of inputting a character string, a quick response (QR) code (registered trademark) may be images, or wireless communication using near-field communication (NFC), Bluetooth (registered trademark), or the like may be used. Alternatively, wireless communication using IEEE 802.11ad, TransferJet (registered trademark), or the like may be used.

Note that the character string to be input may be, in addition to a character string displayed on a display unit, a character string adhered to a housing of a communication apparatus in the form of a sticker or the like. Alternatively, the character string to be input may be a character string adhered to an instruction manual or wrapping, such as a corrugated cardboard used at the time of selling a communication apparatus. In addition, the character string may be a barcode or a two-dimensional code.

Furthermore, in the above embodiments, action frames based on the IEEE 802.11 standard are used as a providing apparatus search signal, a response thereto, and a providing operation report signal. However, other message frames may also be used. For example, a Probe Request/Response message based on the IEEE 802.11 standard may be used. Embodiments of the present invention can also be realized by supplying a program realizing one or more functions of the above embodiments to a system or apparatus through a network or a storage medium and reading and executing the program by using one or more processors in a computer of the system or apparatus. Embodiments of the present invention can also be realized by a circuit (e.g., ASIC) realizing one or more functions.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-144400, filed Jul. 21, 2015, which is hereby incorporated by reference herein in its entirety.

The invention claimed is:

1. A communication apparatus comprising:
one or more memories; and
one or more processors in communication with the one or more memories, the one or more processors configured to provide:
an acquiring unit that acquires a predetermined character string input by a user;
a first transmitting unit that transmits a search signal including information based on the character string acquired by the acquiring unit, the search signal being used to search for a providing apparatus that provides a communication parameter;
a receiving unit that receives a response to the search signal;
a first generation unit that generates an encryption key based on the character string acquired by the acquiring unit;
a second generation unit that generates a public key and a private key;
an encryption unit that encrypts the public key generated by the second generation unit by using the encryption key generated by the first generation unit;
a second transmitting unit that transmits the public key encrypted by the encryption unit to the providing apparatus that has transmitted the response; and
a starting unit that starts, on the basis of the response received by the receiving unit, communication parameter sharing processing using at least one of the public key and the private key with the providing apparatus that has transmitted the response.

2. The communication apparatus according to claim 1, wherein, in the communication parameter sharing processing, a communication parameter is shared on the basis of a public key encryption method using the public key and the private key generated by the second generation unit and a public key and a private key generated by the providing apparatus.

3. The communication apparatus according to claim 1, wherein the one or more processors configured to further provide a generating unit that generates the information by applying a hash function to a part or all of the character string acquired by the acquiring unit.

4. The communication apparatus according to claim 3, wherein the hash function is Secure Hash Algorithm-2.

5. The communication apparatus according to claim 1, wherein the communication parameter is used to allow the communication apparatus to join a wireless network that the providing apparatus has joined.

6. The communication apparatus according to claim 5, wherein the communication parameter is used to allow the communication apparatus to be connected to an access point in the wireless network that the providing apparatus has joined.

7. The communication apparatus according to claim 1, wherein the communication parameter includes at least one of a service set identifier, an encryption key, an encryption method, an authentication key, and an authentication method.

8. The communication apparatus according to claim 1, wherein the communication parameter is used to perform wireless communication conforming to an IEEE 802.11 standard.

9. A communication method comprising:
acquiring a predetermined character string input by a user;
transmitting a search signal including information based on the character string acquired in the acquiring, the search signal being used to search for a providing apparatus that provides a communication parameter;
receiving a response to the search signal;
generating an encryption key based on the character string acquired;
generating a public key and a private key;
encrypting the public key by using the encryption key;
transmitting the public key to the providing apparatus that has transmitted the response; and
starting, on the basis of the response received in the receiving, communication parameter sharing processing using at least one of the public key and the private key with the providing apparatus that has transmitted the response.

10. A non-transitory computer-readable medium storing a computer program for causing a computer to function as:
an acquiring unit that acquires a predetermined character string input by a user;
a first transmitting unit that transmits a search signal including information based on the character string acquired by the acquiring unit, the search signal being used to search for a providing apparatus that provides a communication parameter;
a receiving unit that receives a response to the search signal;
a first generation unit that generates an encryption key based on the character string acquired by the acquiring unit;
a second generation unit that generates a public key and a private key;
an encryption unit that encrypts the public key generated by the second generation unit by using the encryption key generated by the first generation unit;
a second transmitting unit that transmits the public key encrypted by the encryption unit to the providing apparatus that has transmitted the response; and
a starting unit that starts, on the basis of the response received by the receiving unit, communication parameter sharing processing using at least one of the public key and the private key with the providing apparatus that has transmitted the response.

* * * * *